(12) United States Patent
Chen et al.

(10) Patent No.: US 11,216,483 B2
(45) Date of Patent: Jan. 4, 2022

(54) METHODS, ELECTRONIC DEVICES AND COMPUTER PROGRAM PRODUCT FOR REPLICATING METADATA

(71) Applicant: EMC IP Holding Company LLC, Hopkinton, MA (US)

(72) Inventors: Xiao Chen, Shanghai (CN); Richard Ding, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 308 days.

(21) Appl. No.: 16/442,305

(22) Filed: Jun. 14, 2019

(65) Prior Publication Data
US 2020/0142904 A1    May 7, 2020

(30) Foreign Application Priority Data
Nov. 2, 2018  (CN) .......................... 201811303605.2

(51) Int. Cl.
*G06F 16/27* (2019.01)
*G06F 16/22* (2019.01)

(52) U.S. Cl.
CPC .......... *G06F 16/27* (2019.01); *G06F 16/2246* (2019.01)

(58) Field of Classification Search
CPC ....................................................... G06F 16/27
See application file for complete search history.

(56) References Cited

U.S. PATENT DOCUMENTS

| | | | |
|---|---|---|---|
| 2011/0196828 A1* | 8/2011 | Drobychev | G06F 16/275 707/622 |
| 2018/0329967 A1* | 11/2018 | Lee | G06F 16/27 |
| 2020/0218705 A1* | 7/2020 | Pidduck | G06F 16/2228 |

* cited by examiner

*Primary Examiner* — Van H Oberly
(74) *Attorney, Agent, or Firm* — Amin, Turocy & Watson, LLP

(57) ABSTRACT

Metadata is replicated. For instance, in response to receiving a request for replicating metadata to a target node, information of an index structure associated with the metadata is obtained. The index structure may include terminal nodes for storing the metadata and index nodes for storing index information of the terminal nodes. Next, the metadata from the terminal nodes is extracted based on the information of the index structure. Further, a sequence is generated to be replicated of the metadata. The sequence to be replicated includes items of the metadata, and locations of the items in the sequence to be replicated are determined based on key information corresponding to the items. In addition, the items of the metadata, in the sequence to be replicated, are replicated to the target node. In this way, only the metadata in the index structure is replicated, thereby reducing the data amount of replication.

20 Claims, 7 Drawing Sheets

METHODS, ELECTRONIC DEVICES AND COMPUTER PROGRAM PRODUCT FOR REPLICATING METADATA

RELATED APPLICATION

The present application claims the benefit of priority to Chinese Patent Application No. 201811303605.2, filed on Nov. 2, 2018, which application is hereby incorporated into the present application by reference herein in its entirety.

FIELD

The present disclosure generally relate to the field of computer, and more specifically, to a method, electronic device and computer program product for replicating metadata.

BACKGROUND

Remote backup systems, such as Elastic Cloud Storage (ECS), enhance the protection for a storage device against failures/interruption at the geographic level by having a plurality of data copies. In a remote backup system, all types of data (including data and metadata) are stored in chunks. Currently, the metadata are typically stored in copy-on-write (COW)-based index structure (for example, B+ Tree) for fast indexing the locations of data. In the current remote backup system, the whole chunk including data or metadata is typically transmitted from a source node to a target node, such as a newly added remote node, thereby implementing backup of the data or metadata. For example, when backing up the metadata, the whole index structure is replicated to the target node. However, in the data chunks related to the metadata replicated from the source node to the target node, the percentage of the index structure is rather low. This may lead to unnecessary resource (bandwidth, memory, IO, or the like) overhead, or even make the service unavailable for a certain period of time.

SUMMARY

The embodiments of the present disclosure provide a method, a device and a computer program product for replicating metadata.

In a first aspect of the present disclosure, there is provided a method of replicating metadata. The method may include: in response to receiving a request for replicating metadata to a target node, obtaining information of an index structure associated with the metadata. The index structure may include terminal nodes for storing the metadata and index nodes for storing index information of the terminal nodes. The method may also include: extracting the metadata from the terminal nodes based on the information of the index structure. The method may further include: generating a sequence to be replicated of the metadata. The sequence to be replicated may include a plurality of items of the metadata, and locations of the plurality of items in the sequence to be replicated are determined based on key information corresponding to the plurality of items. In addition, the method may include: replicating, to the target node, the plurality of items of the metadata in the sequence to be replicated.

In some embodiments, replicating the plurality of items of the metadata to the target node may include: comparing a total size of the plurality of items of the metadata with a threshold size; in response to the total size exceeding the threshold size, partitioning the plurality of items of the metadata according to a predetermined size, the predetermined size being below or equal to the threshold size; and replicating the partitioned plurality of items of the metadata to the target node.

In some embodiments, replicating the plurality of items of the metadata to the target node may include: determining a maximum length of metadata that permits to be replicated in each replication; determining, based on the maximum length, a number of items that can be replicated from the metadata in each replication; and replicating the number of items from the metadata to the target node.

In some embodiments, the solution may further include: recording key information of an end item replicated to the target node in each replication, as key information of a start item of a next replication.

In some embodiments, the solution may further include: in response to failure of the replication of the number of items from the metadata, determining an end item replicated to the target node in a preceding replication; and replicating the number of items following the end item of the metadata to the target node.

In some embodiments, obtaining the information of the index structure may include: obtaining information related to leaf pages and index pages included in a B+ Tree, the leaf pages being used for storing the metadata and the index pages being used for storing index information of the leaf pages.

In a second aspect of the present disclosure, there is provided an electronic device. The device may include: at least one processing unit; and at least one memory, which is coupled to the at least one processing unit and stores a machine executable instruction, the instruction, when executed by the at least one processing unit, causing the device to execute acts of: in response to receiving a request for replicating metadata to a target node, obtaining information of an index structure associated with the metadata, the index structure including terminal nodes for storing the metadata and index nodes for storing index information of the terminal nodes; extracting the metadata from the terminal nodes, based on the information of the index structure; generating a sequence to be replicated of the metadata, the sequence to be replicated comprising a plurality of items of the metadata, locations of the plurality of items in the sequence to be replicated being determined based on key information corresponding to the plurality of items; and replicating, to the target node, the plurality of items of the metadata in the sequence to be replicated.

In a third aspect of the present disclosure, there is provided a computer program product tangibly stored on a non-transient computer readable medium and includes a machine executable instruction which, when executed, causes a machine to perform the steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of the present disclosure will become more apparent, through the following detailed description of the example embodiments of the present disclosure with reference to the FIG. 1 illustrates a diagram of an index structure and the corresponding sequence to be replicated.

DETAILED DESCRIPTION OF EMBODIMENTS

Preferred embodiments of the present disclosure will now be described in detail with reference to the drawings. Although the drawings illustrate the preferred embodiments of the present disclosure, it should be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Remote backup systems, such as Elastic Cloud Storage (ECS), enhance the user data protection mechanism by having a plurality of data copies (i.e., a primary copy of data at a source node and copies of data at a target node), thereby preventing data loss caused by node failure or interruption. By replicating user data to a plurality of target nodes at different geographical locations, the user data protection mechanism may be promoted to a geographical level.

A backup system may use an index structure (for example, B+ Tree) to index locations of metadata stored in a disk space. The index structure stores therein key-value (KV) pairs. These KV pairs are typically stored in the index structure for fast indexing the locations of the metadata.

In a remote backup system, all disk space is partitioned into a set of chunks having a fixed size. Chunks are written in an append-only pattern, which means that writing a chunk into the disk space does not cause modification/deletion of the existing content but update in a new chunk when new content arrives. Likewise, in the index structure, when the metadata are modified, terminal nodes for storing the metadata in the index structure are written in chunks into new locations, and meanwhile, index nodes associated with the terminal nodes are also required to respond to the update to be written into new locations. As such, a large amount of garbage is produced. In order to describe the problem more clearly, the specific conditions of metadata update will be described below with reference to FIGS. 1 and 2.

Figure 1:
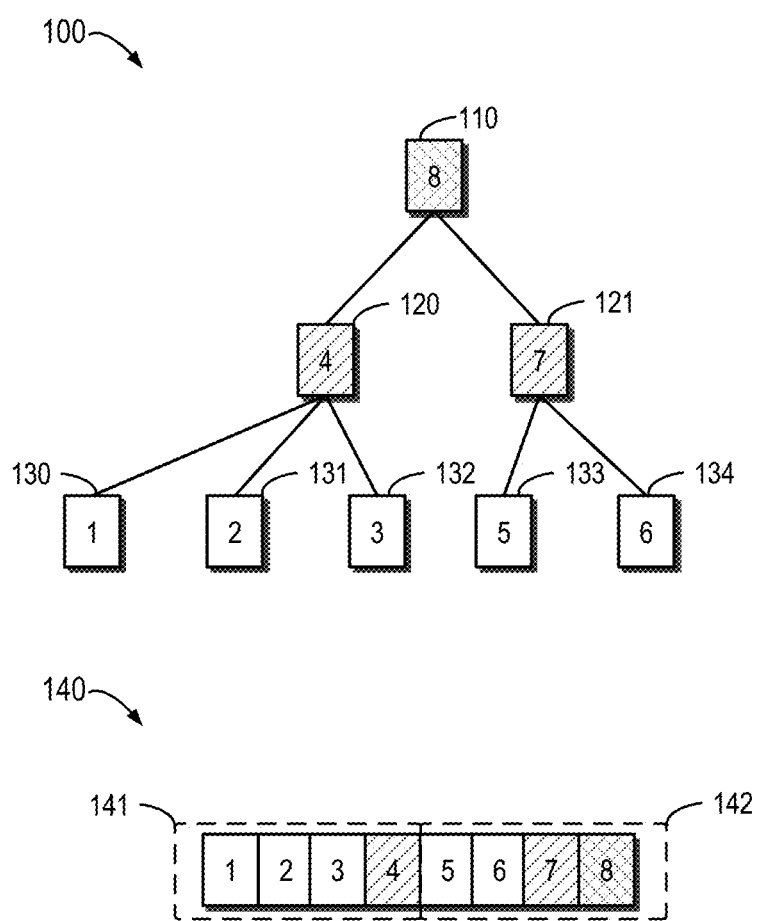

FIG. 1 illustrates a diagram of an index structure 100 and a corresponding sequence to be replicated 140. As shown in FIG. 1, the index structure 100 includes terminal nodes 130, 131, 132, 133, and 134. The terminal nodes 130, 131, 132, 133, and 134 are provided for storing items "1", "2", "3", "5", and "6" of metadata, respectively. It would be appreciated that "1", "2", "3", "5", and "6" are key information in the KV pairs, while the specific content of each item of the metadata is value information in the KV pairs. The key information and the value information have a one-to-one corresponding mapping relation, and the specific content of respective items of the metadata therefore can be searched through the key information. The index structure 100 further includes index nodes 120, 121, and an index node 110 at a higher level, and these index nodes are all used to store the index information of the terminal nodes 130, 131, 132, 133, and 134. As an example, the index node 120 stores therein index information "4" of the terminal nodes 130, 131 and 132, and the index node 121 stores the index information "7" of the terminal nodes 133 and 134. In addition, the index node 110 stores therein the index information "8" of the terminal nodes 120 and 121. It would be appreciated that the index information "4", "7" and "8" are key information in the KV pairs, and the specific content of the index information is the value information in the KV pairs, for indicating location information of the corresponding metadata. The key information and the value information have a one-to-one corresponding mapping relation, and therefore, the specific content of respective items of the metadata may be searched through the key information.

In some conventional solutions, when receiving a request for replicating the index structure 100 in a source node to a target node, the items 1, 2, 3, 5, and 6 of the metadata and the index information 4, 7, and 8 are arranged in a sequence to be replicated 140 according to a predetermined mechanism. As shown in FIG. 1, assuming that a minimum chunk capacity for reading, writing and transmitting data is 4 to 5 items of metadata, the sequence to be replicated 140 is partitioned into two chunks 141 and 142, each of which has 4 items of metadata. The chunks 141 and 142 will be sequentially replicated to the target node, thereby completing metadata backup. However, once the metadata are updated, there may generate a problem of backup resource waste.

Figure 2:
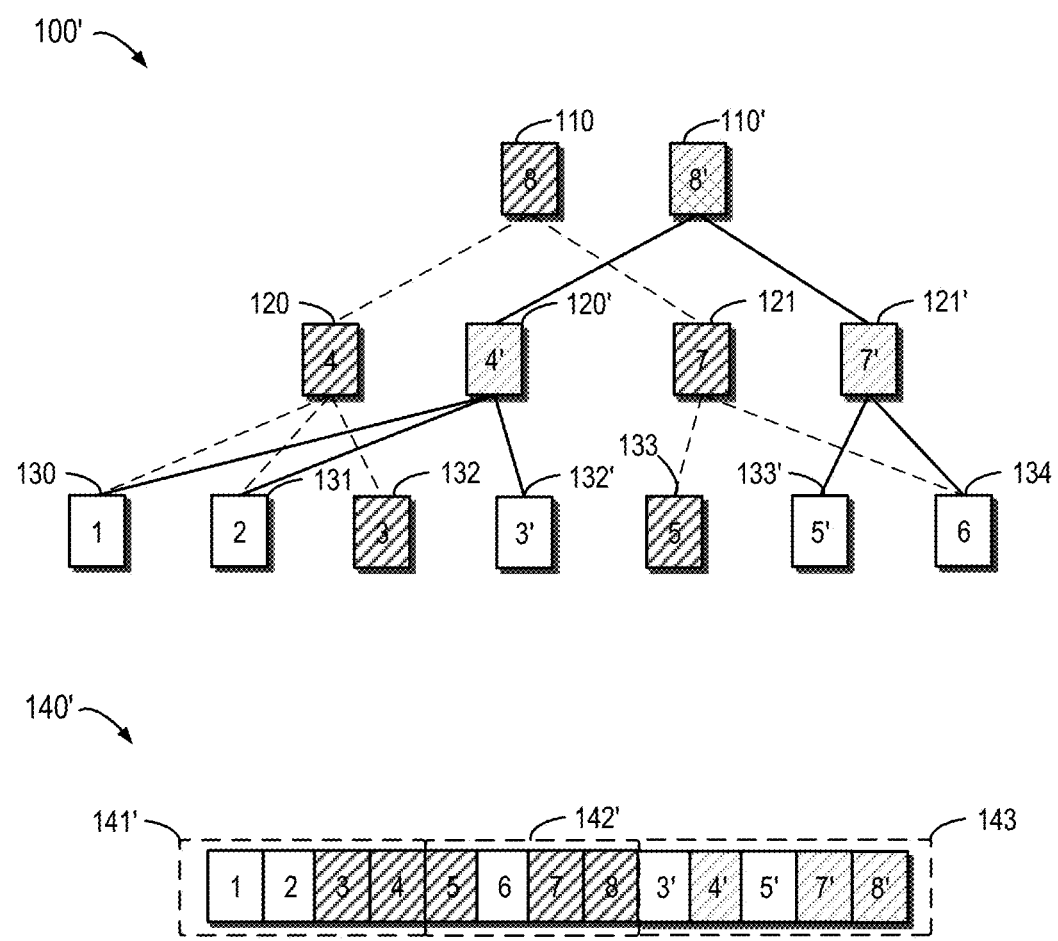
FIG. 2 illustrates a diagram of the updated index structure and the corresponding updated sequence to be replicated.

FIG. 2 illustrates a diagram of the legacy updated index structure 110' and the corresponding updated sequence to be replicated 140'. As shown in FIG. 2, the items 3 and 5 of the metadata are updated to items 3' and 5'. At this time, the terminal nodes for storing items 3 and 5 in the index structure 110' are written in chunks into new locations 132' and 133'. In addition, index nodes 120', 121' and 110' associated with the terminal nodes 132' and 133' are updated likewise.

In FIG. 2, the updated index structure 100' includes terminal nodes 130, 131, 132', 133', and 134 for storing items 1, 2, 3', 5' and 6 of the metadata, respectively. The updated index structure 100' further includes index nodes 120', 121', and an index node 110' at a higher level for storing index information 4', 7', and 8' of the terminal nodes 130, 131, 132', 133', and 134. When receiving a request for replicating the index structure 100' in the source node to a target node, the items 1, 2, 3, 5 and 6 of the metadata, the index information 4, 7 and 8, and the updated items 3', 4', 5', 7' and 8' of the metadata are all arranged in a sequence to be replicated 140'. As shown in FIG. 2, the items 3, 4, 5, 7, and 8 of the metadata are data to be discarded. In addition to the chunks 141' and 142', the sequence to be replicated 140 is required to further include a chunk 143. Therefore, the number of chunks required to be replicated to the target node is increased, thereby incurring backup resource waste. It would be appreciated that the conditions as shown in FIGS. 1 and 2 are provided only as an example. In actual use, the metadata are updated more frequently, and the backup resource waste deteriorates accordingly.

In order to solve at least in part the above and other potential problems and deficiencies, the embodiments of the present disclosure provide a solution for replicating metadata. For the above problem, the solution for replicating metadata in the present disclosure makes the following improvements: only a plurality of items of the metadata are arranged sequentially in a sequence to be replicated, rather than all data in chunks including index information and garbage data generated from update. In the way, it may improve efficiently the metadata replicating efficiency and thus reduce the resource overhead.

According to an embodiment of the present disclosure, when receiving a request for replicating the index structure 100 in the source node to a target node, only items 1, 2, 3, 5 and 6 of the metadata may be arranged in a sequence to be replicated. Thus, the sequence to be replicated only includes a chunk. In the way, the data related to the metadata to be transmitted to the target node are reduced significantly, and metadata replicated to the target node will recreate a new index structure (not shown) based on the key information thereof.

Figure 3:
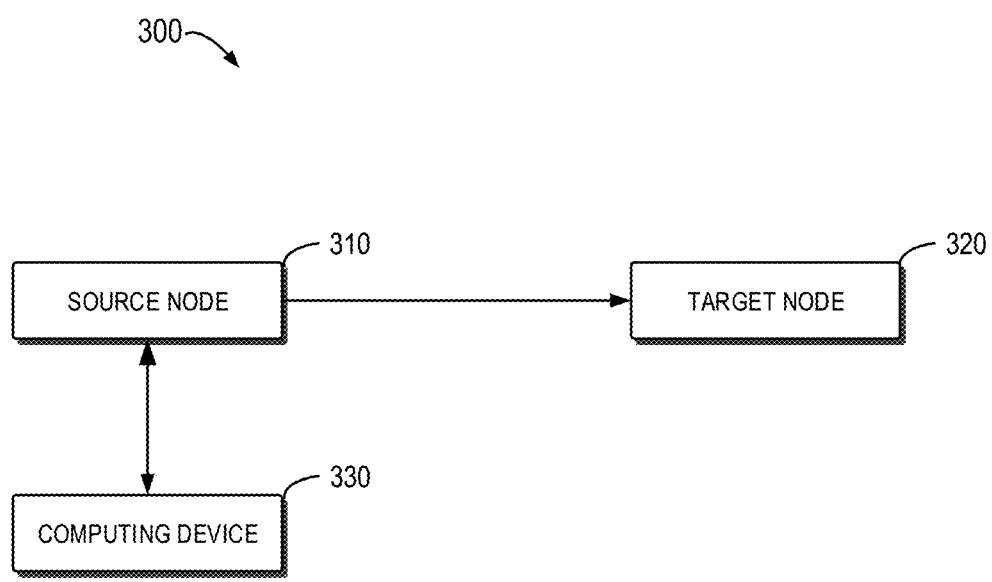
FIG. 3 illustrates a diagram of an example environment in which a plurality of embodiments of the present disclosure may be implemented.

FIG. 3 illustrates a diagram of an example environment 300 in which a plurality of embodiments of the present disclosure may be implemented. As shown in FIG. 3, in order to ensure safety of metadata on the source node 310, the metadata on the source node 310 may be backed up to the target node 320. A computing device 330 in communication connection with the source node 310 may be used to execute the procedure of replicating the metadata from the source node 310 to a target node 320. Both of the source node 310 and the target node 320 may be any local storage device or distributed storage device for storing metadata, such as a network additional storage (NAS) device and the like. The storage device may include various volatile and/or non-volatile data storage media, such as a magnetic disk, optical disk, hard disk, solid-state disk (SSD), cache and the like.

In some embodiments, when a backup request, from a user, at the side of the source node 310 or the target node 320 is received, the metadata are replicated from the source node 310 to the target node 320. Alternatively or additionally, after a new target node 320 is created, the metadata are replicated from the source node 310 to the newly created target node 320. The procedure of replicating or backing up metadata will be described below with reference to FIGS. 4, 5, and 6.

Figure 4:
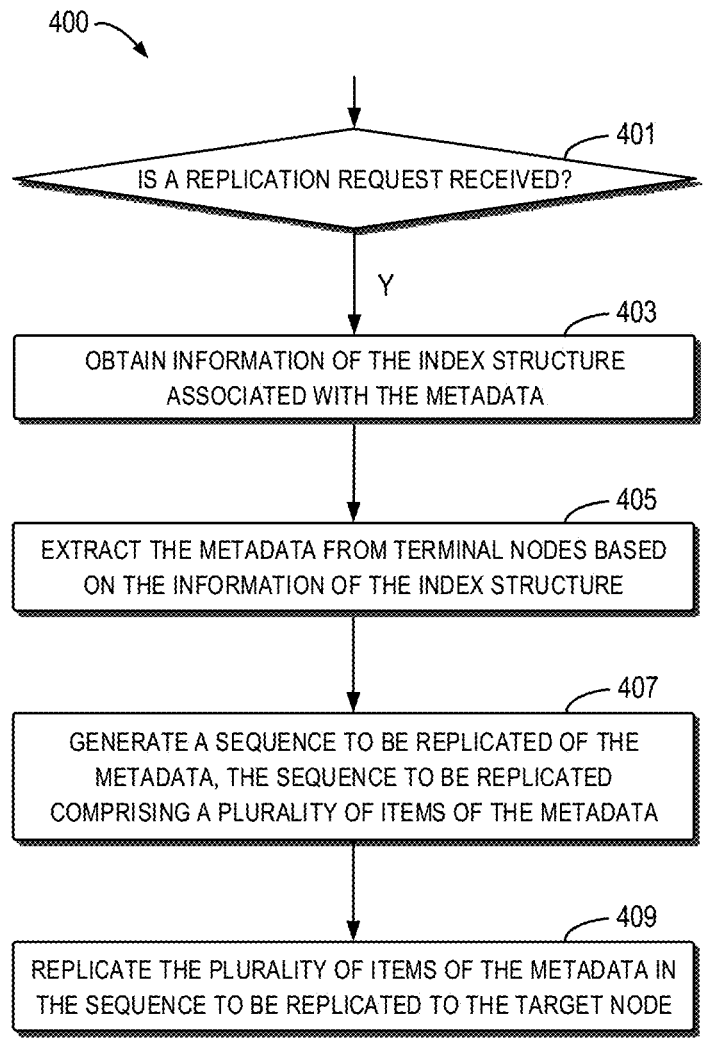
FIG. 4 illustrates a flowchart of a procedure or method of replicating metadata according to an embodiment of the present disclosure.
Figure 7:
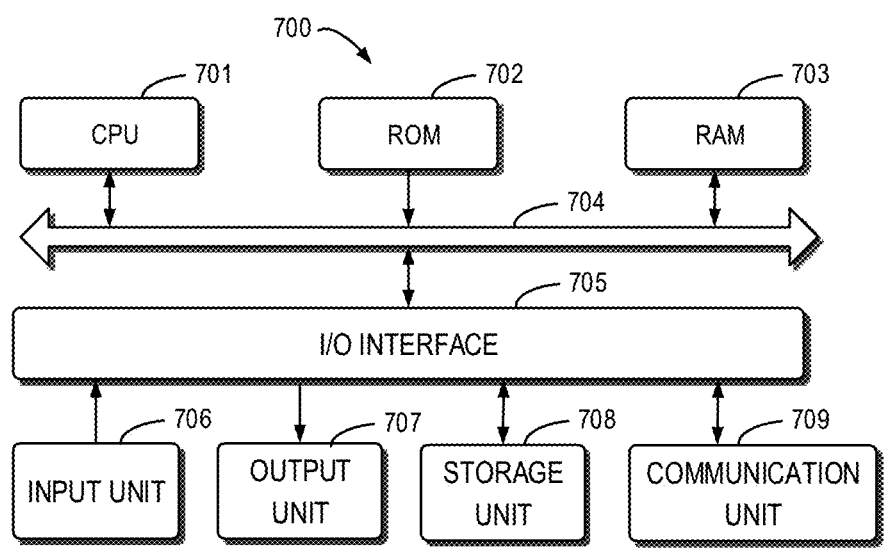
FIG. 7 illustrates a block diagram of a device for replicating metadata according to an embodiment of the present disclosure.

FIG. 4 illustrates a flowchart of a procedure or method 400 for replicating metadata according to an embodiment of the present disclosure. In some embodiments, the method 400 may be implemented in a device as shown in FIG. 7. As an example, the method 400 may be implemented in the source node 310 as shown in FIG. 3 or the computing device 330 in communication connection with the source node. Now referring to FIGS. 1 and 3, the procedure or method 400 for replicating metadata for replicating metadata according to an embodiment of the present disclosure, as shown in FIG. 4, is described. For ease of understanding, the specific data as mentioned below are all provided as an example, without limiting the protection scope of the present disclosure.

At 401, it is determined whether a request for replicating metadata to the target node 320 is received. In some embodiments, the request for replicating metadata may be sent by a user at the source node 310 side. Alternatively or additionally, the request for replicating metadata may also be sent by a user at the target node 320 side. Furthermore, if the target node 320 is a newly created target node, after the target node 320 has been created, the metadata are replicated from the source node 310 to the newly created target node 320. As shown in FIG. 4, when it is determined that the request for replicating metadata to the target node 320 has been received, the procedure/method proceeds to 403.

At 403, information of the index structure 100 associated with the metadata is obtained. The index structure 100 includes terminal nodes 130, 131, 132, 133, and 134 for storing items 1, 2, 3, 5, and 6 of the metadata, and index nodes 120, 121, and 110 for storing index information of the terminal nodes 130, 131, 132, 133, and 134. In some embodiments, the index structure 100 may be B+ Tree as shown in FIG. 1. It would be appreciated that the index structure 100 may also be other tree or mapping structure for indexing the metadata.

At 405, the items 1, 2, 3, 5, and 6 of the metadata are extracted from the terminal nodes 130, 131, 132, 133, and 134 based on the information of the index structure 100. It would be appreciated that the procedure of "extracting" items of the metadata, as mentioned here, is not only used to describe the procedure of extracting the items 1, 2, 3, 5, and 6 of the metadata from the terminal nodes 130, 131, 132, 133, and 134, but also used to expound "recognizing" and "detecting" the items 1, 2, 3, 5, and 6 of the metadata in the terminal nodes 130, 131, 132, 133 and 134.

At 407, the sequence to be replicated of the metadata is generated. In some embodiments, the sequence to be replicated includes a plurality of items 1, 2, 3, 5, and 6 of the metadata. Preferably, the locations of the items 1, 2, 3, 5, and 6 in the sequence to be replicated are determined based on the key information corresponding to the items 1, 2, 3, 5, and 6. In some embodiments, respective items of the metadata are stored in KV pairs in respective terminal nodes, codes for items (for example, 1, 2, 3, 5, and 6 as shown in FIG. 1) are key information in the KV pairs, and the specific content of the respective items of the metadata are value information in the KV pairs. The key information and the value information have a one-to-one corresponding mapping relation, and therefore the specific content of respective items of the metadata may be searched through the key information. In the embodiment about the B+ Tree as described above, the B+ Tree index structure may be created based on respective items of the metadata and the key information of respective items of the index information. In some embodiments, the sequence to be replicated only includes items 1, 2, 3, 5, and 6 of the metadata. It would be appreciated that the procedure of "generating" the sequence to be replicated, as mentioned here, is not only used to describe the procedure of generating a sequence for including respective items of the metadata, but also used to expound the procedure of sorting the plurality of items of the metadata, for example, based on the key information.

At 409, the plurality of items 1, 2, 3, 5, and 6 of the metadata in the sequence to be replicated is replicated to the target node 320. In the way, only the metadata in the index structure are replicated, and it is unnecessary to replicate the whole index structure related to the metadata at the chunk level, thereby reducing the data amount of replication. In addition, since the respective items of the metadata are arranged sequentially according to the key information, less B+ Tree garbage is generated when rebuilding, for example, a B+ Tree index structure at the target node 320 side. Meanwhile, the updates of the index page are minimized, thereby reducing the capacity overhead at the target node 320 side. Moreover, since the respective items of the metadata are arranged sequentially according to the key information, adjacent B+ Tree nodes are located at adjacent physical locations on the disk, which is advantageous for the list performance and thus reduces disk IO.

Figure 5:
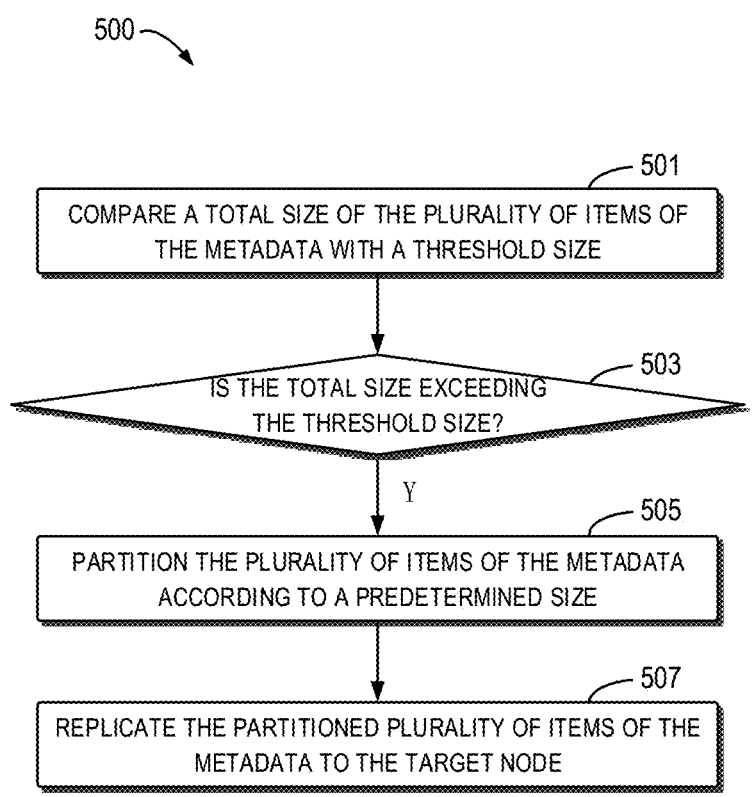
FIG. 5 illustrates a flowchart of a procedure or method of replicating metadata according to an embodiment of the present disclosure.

In order to further improve the performance of the above procedure 400, operations may be executed following the procedure 500 as shown in FIG. 5.

FIG. 5 illustrates a flowchart of a procedure or method 500 for replication metadata according to an embodiment of the present disclosure. Specifically, FIG. 5 illustrates an example embodiment of replicating a plurality of items 1, 2, 3, 5, and 6 of metadata in the sequence to be replicated, as shown in FIG. 4, to the target node 320. In some embodiments, the method 500 can be implemented in the device as shown in FIG. 7. As an example, the method 500 can be implemented in the source node 310 as shown in FIG. 3 or the computing device 330 in communication connection with the source node. Now referring to FIGS. 1 and 3, the procedure or method 500 for replicating metadata according to an embodiment of the present disclosure, as shown in FIG. 5, is described. For ease of understanding, the specific data as mentioned in the following description are provided merely as an example, without limiting the protection scope of the present disclosure.

At 501, the total size of the plurality of items 1, 2, 3, 5, and 6 of the metadata is compared with a threshold size. As an example, the total size of the metadata in the index structure 100 may be searched directly. Alternatively or additionally, the sizes of the items 1, 2, 3, 5, and 6 of the metadata in the respective terminal nodes 130, 131, 132, 133, and 134 in the index structure 100 may be summed up, to obtain the total size.

At 503, it is determined whether the total size is exceeding the threshold size. It would be appreciated that the threshold size is mainly determined by, for example, hardware configuration of a memory of the target node 320. When the total size is exceeding the threshold size, the procedure or method proceeds to 505.

At 505, the items 1, 2, 3, 5, and 6 of the metadata are partitioned according to a predetermined size. In some embodiments, the predetermined size may be below or equal to the threshold size. For example, when the sum of the sizes of the items 1, 2, and 3 is less than or equal to the predetermined size, these items can be sent to the target node as a set.

At 507, the partitioned plurality of items of the metadata are replicated to the target node 320.

By implementing the above procedure, since the plurality of items of the metadata arranged sequentially are replicated in batches, it is no need to replicate the whole index structure 100 including a large amount of garbage at the chunk level. The solution may reduce bandwidth consumption and thus help the user lower the cost.

Figure 6:
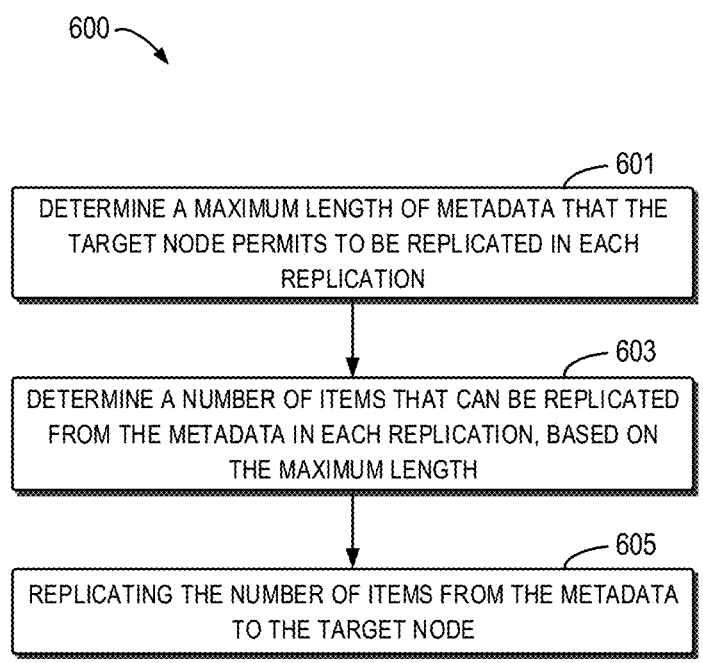
FIG. 6 illustrates a flowchart of a procedure or method of replicating metadata according to an embodiment of the present disclosure.

Alternatively or additionally, the procedure of replicating a plurality of items 1, 2, 3, 5 and 6 of the metadata in the sequence to be replicated to the target node 320, as shown in FIG. 4, may be implemented through the procedure 600 as shown in FIG. 6.

FIG. 6 illustrates a flowchart of the procedure or method 600 of replicating metadata according to an embodiment of the present disclosure. In some embodiments, the method 600 may be implemented in a device as shown in FIG. 7. For example, the method 600 may be implemented in the source node 310 or the computing device 330 in communication connection with the source node as shown in FIG. 3. Now referring to FIGS. 1 and 3, the procedure or method 600 for replicating metadata according to an embodiment of the present disclosure as shown in FIG. 6 is described. For ease of understanding, the specific data as mentioned below are provided only as an example, without limiting the protection scope of the present disclosure.

At 601, the maximum length of the metadata that the target node 320 permits to be replicated in each replication is determined. It would be appreciated that the maximum length of the metadata permitted to be replicated in each replication is mainly determined by, for example, hardware configuration of the memory of the target node 320. By determining the maximum length, it can be determined that the metadata may be replicated in batches.

At 603, a number of items that can be replicated from the metadata in each replication is determined based on the maximum length. In some embodiments, the metadata to be replicated are intercepted directly according to the maximum length. For example, when replication is started from the item 1 of the metadata, the replication will be stopped if it is detected that the replicated size of the replicated metadata reaches the maximum length after the item 3 has been replicated. After completing processing the items 1, 2 and 3 of the metadata, the target node 320 further starts the replication from item 4, and so on, until the whole procedure of replicating metadata is completed. Alternatively or additionally, the metadata to be replicated may be intercepted according to a fixed length which is less than the maximum length.

At 605, the items, of the above number, of the metadata are replicated to the target node 320.

By implementing the above procedure, since a plurality of sequentially arranged items of the metadata are replicated in batches, the bandwidth consumption may be reduced. The data related to the metadata may be replicated in parallel, thereby saving the total replication time.

In some embodiments, the above solution can further include: recording key information of an end item replicated to the target node in each replication, as key information of a start item of the next replication.

In some embodiments, the above solution can further include: in response to failure of the replication of the number of items from the metadata, determining an end item replicated to the target node in a preceding replication; and replicating the number of items following the end item of metadata to the target node.

In some embodiments, obtaining the information of the index structure may include: obtaining information related to leaf pages and index pages included in the B+ tree, where the leaf pages are used to store the metadata, and the index pages are used to store index information of the leaf pages.

FIG. 7 illustrates a schematic block diagram of an example device 700 that may be used to implement an embodiment of the present disclosure. As illustrated, the device 700 includes a central processing unit (CPU) 701 which may performs various appropriate actions and processing, based on a computer program instruction stored in a read-only memory (ROM) 702 or the computer program instructions loaded from a storage unit 708 into a random access memory (RAM) 703. The RAM 703 may also store all kinds of programs and data required f by operating the storage device 700. CPU 701, ROM 702 and RAM 703 are connected to each other via a bus 704, to which an input/output (I/O) interface 705 is also connected.

A plurality of components in the device 700 are connected to the I/O interface 705, including: an input unit 706, such as keyboard, mouse and the like; an output unit 707, such as various types of display, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, e.g., the methods 400, 500 and/or 600 may be executed by the processing unit 701. As an example, in some embodiments, the methods 400, 500 and/or 600 may be implemented as a computer software program that is tangibly included in a machine readable medium, e.g., the storage unit 708. In some embodiments, the computer programs may be partially or completely loaded and/or installed to the device 700 via ROM 702 and/or communication unit 709. When the computer program is loaded to the RAM 703 and executed by CPU 701, one or more steps of the above described methods 400, 500 and/or 600 may be implemented.

The present disclosure may be a method, an apparatus, a system and/or a computer program product. The computer program product can include a computer-readable storage medium loaded with computer-readable program instructions thereon for executing various aspects of the present disclosure.

The computer readable storage medium may be a tangible device capable of holding and storing instructions used by an instruction execution device. The computer readable storage medium may be, but is not limited to, for example, electronic storage devices, magnetic storage devices, optical storage devices, electromagnetic storage devices, semiconductor storage devices, or any random appropriate combination thereof. More specific examples (non-exhaustive list) of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as a punched card storing instructions or an emboss within a groove, and any random suitable combination thereof. A computer readable storage medium used herein is not interpreted as a transitory signals per se, such as radio waves or other freely propagated electromagnetic waves, electromagnetic waves propagated through a waveguide or other transmission medium (e.g., optical pulses passing through fiber-optic cables), or electrical signals transmitted through electric wires.

The computer readable program instructions described herein may be downloaded from a computer readable storage medium to various computing/processing devices, or to external computers or external storage devices via a network, for example, the Internet, a local area network, a wide area network and/or a wireless network. The network may include copper transmission cables, optical fiber transmission, wireless transmission, routers, firewalls, switches, gateway computers and/or edge servers. The network adapter or network interface in each computing/processing device receives computer readable program instructions from the network and forwards the computer readable program instructions for storage in a computer readable storage medium of each computing/processing device.

Computer readable program instructions for executing the operations of the present disclosure may be assembly instructions, instructions of instruction set architecture (ISA), machine instructions, machine dependent instructions, microcode, firmware instructions, state setting data, or either source code or destination code written by any combination of one or more programming languages including object oriented programming languages, such as Smalltalk, C++ or the like, and conventional procedural programming languages, such as the "C" programming language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagrams of method, apparatus (systems), and computer program product according to embodiments of the present disclosure. It will be understood that each block in the flow chart and/or block diagrams, and any combinations of various blocks thereof may be implemented by computer readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer readable program instructions may also be loaded into computers, other programmable data processing devices, or other devices, so as to execute a series of operational steps on the computer, other programmable data processing devices or other devices to generate a computer implemented process. Therefore, the instructions executed on the computer, other programmable data processing devices, or other device may realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the block diagram and/or flow chart, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method, comprising:
   in response to receiving a request for replicating metadata to a target node, obtaining, by a system comprising a processor, information of an index structure associated with the metadata, the index structure comprising terminal nodes for storing the metadata and index nodes for storing index information of the terminal nodes;
   extracting the metadata from the terminal nodes based on the information of the index structure;
   generating a sequence to be replicated of the metadata, the sequence to be replicated comprising a plurality of items of the metadata, locations of the plurality of items in the sequence to be replicated being determined based on key information corresponding to the plurality of items; and
   replicating, to the target node, the plurality of items of the metadata in the sequence to be replicated, wherein the replicating the plurality of items of the metadata to the target node comprises:
   determining a maximum length of metadata that the target node permits to be replicated in each replication;
   determining, based on the maximum length, a number of items that is able to be replicated from the metadata in each replication; and
   replicating the number of items from the metadata to the target node.

2. The method of claim 1, wherein the replicating the plurality of items of the metadata to the target node comprises:
   comparing a total size of the plurality of items of the metadata with a threshold size;
   in response to the total size exceeding the threshold size, partitioning the plurality of items of the metadata according to a predetermined size, the predetermined size being below or equal to the threshold size, the partitioning resulting in a partitioned plurality of items of the metadata; and
   replicating the partitioned plurality of items of the metadata to the target node.

3. The method of claim 1, further comprising:
   recording key information of an end item replicated to the target node in each replication, as key information of a start item of a next replication.

4. The method of claim 1, further comprising:
   in response to failure of the replication of the number of items from the metadata, determining an end item replicated to the target node in a preceding replication; and
   replicating the number of items following the end item of the metadata to the target node.

5. The method of claim 3, further comprising:
   in response to failure of the replication of the number of items from the metadata, determining an end item replicated to the target node in a preceding replication; and
   replicating the number of items following the end item of the metadata to the target node.

6. The method of claim 1, wherein the obtaining the information of the index structure comprises:
   obtaining information related to leaf pages and index pages included in a B+Tree, the leaf pages being used for storing the metadata and the index pages being used for storing index information of the leaf pages.

7. A device, comprising:
   at least one processing unit; and
   at least one memory, which is coupled to the at least one processing unit and stores a machine executable instruction, the instruction, when executed by the at least one processing unit, causes the device to execute acts of:
   in response to receiving a request for replicating metadata to a target node, obtaining information of an index structure associated with the metadata, the index structure including terminal nodes for storing the metadata and index nodes for storing index information of the terminal nodes;
   extracting the metadata from the terminal nodes, based on the information of the index structure;
   generating a sequence to be replicated of the metadata, the sequence to be replicated comprising a plurality of items of the metadata, locations of the plurality of items in the sequence to be replicated being determined based on key information corresponding to the plurality of items; and
   replicating, to the target node, the plurality of items of the metadata in the sequence to be replicated, wherein the replicating the plurality of items of the metadata to the target node comprises:
   determining an upper limit on length of metadata that the target node permits to be replicated in each replication;
   determining, based on the upper limit on length, a number of items that is able to be replicated from the metadata in each replication; and
   replicating the number of items from the metadata to the target node.

8. The device of claim 7, wherein the replicating the plurality of items of the metadata to the target node comprises:
 comparing a total size of the plurality of items of the metadata with a threshold size;
 in response to the total size exceeding the threshold size, partitioning the plurality of items of the metadata according to a predetermined size, the predetermined size being below or equal to the threshold size, resulting in a partitioned plurality of items of the metadata; and
 replicating the partitioned plurality of items of the metadata to the target node.

9. The electronic device of claim 7, wherein the acts further comprise:
 recording key information of an end item replicated to the target node in each replication, as key information of a start item of a next replication.

10. The device of claim 7, wherein the acts further comprise:
 in response to failure of the replication of the number of items from the metadata, determining an end item replicated to the target node in a preceding replication; and
 replicating the number of items following the end item of the metadata to the target node.

11. The device of claim 9, wherein the acts further comprise:
 in response to failure of the replication of the number of items from the metadata, determining an end item replicated to the target node in a preceding replication; and
 replicating the number of items following the end item of the metadata to the target node.

12. The device of claim 7, wherein the obtaining the information of the index structure comprises:
 obtaining information related to leaf pages and index pages included in a B+Tree, the leaf pages being used for storing the metadata and the index pages being used for storing index information of the leaf pages.

13. A computer program product, which is stored on a non-transitory computer readable medium and comprises at least one machine executable instruction, the at least one machine executable instruction, when executed, causes a machine to execute operations, comprising:
 in response to receiving a request for replicating metadata to a target node, obtaining information of an index structure associated with the metadata, the index structure comprising terminal nodes for storing the metadata and index nodes for storing index information of the terminal nodes;
 extracting the metadata from the terminal nodes based on the information of the index structure;
 generating a sequence to be replicated of the metadata, the sequence to be replicated comprising a plurality of items of the metadata, locations of the plurality of items in the sequence to be replicated being determined based on key information corresponding to the plurality of items; and
 replicating, to the target node, the plurality of items of the metadata in the sequence to be replicated, wherein the replicating the plurality of items of the metadata to the target node comprises:
  determining a limit on length of metadata that the target node permits to be replicated in each replication;
  determining, based on the limit on length, a number of items that can be replicated from the metadata in each replication; and
  replicating the number of items from the metadata to the target node.

14. The computer program product of claim 13, wherein the replicating the plurality of items of the metadata to the target node comprises:
 comparing a total size of the plurality of items of the metadata with a threshold size;
 in response to the total size exceeding the threshold size, partitioning the plurality of items of the metadata according to a predetermined size, the predetermined size being below or equal to the threshold size, resulting in a partitioned plurality of items of the metadata; and
 replicating the partitioned plurality of items of the metadata to the target node.

15. The computer program product of claim 13, wherein the operations further comprise:
 recording key information of an end item replicated to the target node in each replication, as key information of a start item of a next replication.

16. The computer program product of claim 13, wherein the operations further comprise:
 in response to failure of the replication of the number of items from the metadata, determining an end item replicated to the target node in a preceding replication; and
 replicating the number of items following the end item of the metadata to the target node.

17. The computer program product of claim 13, wherein the obtaining the information of the index structure comprises:
 obtaining information related to leaf pages and index pages included in a B+Tree, the leaf pages being used for storing the metadata and the index pages being used for storing index information of the leaf pages.

18. The computer program product of claim 13, wherein the operations further comprise:
 arranging the metadata sequentially based on the key information.

19. The computer program product of claim 13, wherein the operations further comprise:
 searching the index structure associated with the metadata by a total size.

20. The computer program product of claim 13, wherein the operations further comprise:
 in response to determining the limit on length of the metadata, replicating the metadata in batches.

* * * * *